J. W. MORRILL.
Ditching Plow.
No. 9,709.  Patented May 10. 1853.
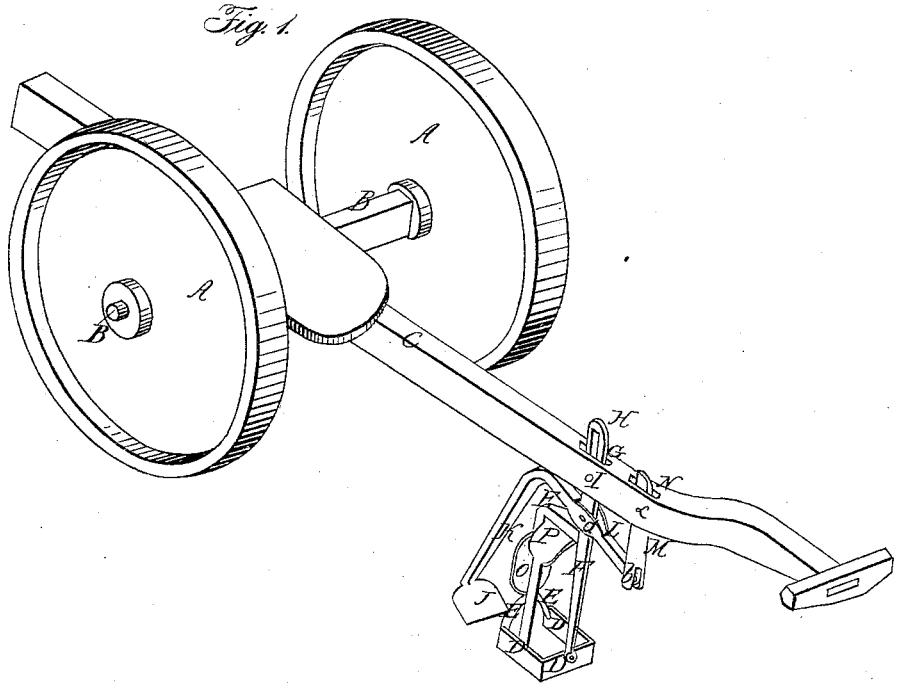
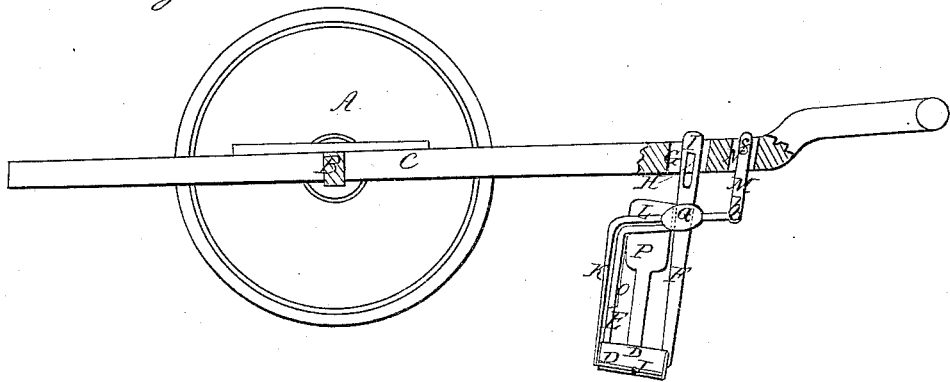

UNITED STATES PATENT OFFICE.

J. W. MORRILL, OF HAMPTON FALLS, NEW HAMPSHIRE.

IMPROVED DITCHING-MACHINE.

Specification forming part of Letters Patent No. 9,709, dated May 10, 1853.

*To all whom it may concern:*

Be it known that I, JONATHAN W. MORRILL, of Hampton Falls, in the county of Rockingham and State of New Hampshire, have invented certain new and useful Improvements in Ditching-Machines; and I do hereby declare that the following is a full, clear, and exact description of the same, reference being had to the accompanying drawings, forming part of this specification, in which—

Figure 1 is a perspective view of the machine applied to a carriage. Fig. 2 is a longitudinal section of the same.

Similar letters of reference in each of the several figures indicate corresponding parts.

The nature of my invention consists in the employment of a square or other shaped hollow cutter, having three sides or vertical cutting-edges of any suitable depth, and being open at top and bottom and on one of its sides or ends, which cutter is made to enter the ground and cut three sides of a sod by the weight of a person applied to a lever or walking-beam, in which vertical slots are cut for the upper end of the handle of the said cutter to pass through and move up and down. This handle has an oblong slot cut through its upper end, in which a pin works as the lever or beam is raised and lowered. In connection with this cutter I employ a spade having an elbow-shaped handle, which hangs and turns on a fulcrum-pin passing through the handle of the cutter, and which is also connected to the lever or walking-beam by means of a connecting-link, and operated likewise through the weight of the operator applied to the lever or beam. This spade is intended for cutting underneath the sod, and is made to enter the open end of the square or box shape cutter, and cut the bottom of the sod loose and sustain it until the machine has been moved a sufficient distance forward and is ready for another cut, when the spade is moved outward from under the sod, and the first sod made to rise upward out of the cutter by the second sod, and discharged on the side of the ditch by suitable means.

To enable others skilled in the art to make and use my invention, I will proceed to describe its construction and operation.

A A represent the wheels for propelling the machine forward as fast as the sods are cut. B is the axle of the same, across which the lever or walking-beam C is placed and secured, as shown in Figs. 1 and 2. This lever serves to operate the cutters, for as the weight of the operator (standing on the same) is applied to the front end of it the square or box cutter D D D is forced a considerable depth into the ground and cuts three sides of the sod.

The cutter D D D, for cutting the sides and front edge of the sod, is braced and supported by means of the forked-shaped brace E, and has a vertical handle, F, secured to its front edge and passing up through the slot G in the lever or beam C, in the manner shown in the drawings. This handle F has a slot, H, cut in its upper end, in which a pin, I, secured (horizontally) fast in the beam C, works up and down as the cutter and beam are operated. The slot H in the handle admits of the lever being depressed to the position shown in Fig. 1, and of its being raised to the position shown in Fig. 2. When the lever is lowered the square cutter operates, and when elevated the spade J operates. The spade J has a bent handle, K L, and hangs and turns on a fulcrum, $a$, that portion lettered K being secured to the spade, and that L secured to the rod or handle F by means of a pin, on which it swings loosely up and down or in and out, as shown in the drawings. The part L is secured to a link, M, by means of a pin, $b$, passing loosely through its end. This link passes through the slot N in the lever C, and is secured loosely in the same by means of a pin, $c$, which allows it to move freely back and forth as the cutter D D D is depressed and the spade J elevated or depressed.

O P are thin strips for guiding the first sod as it is raised by the second sod, and also for throwing it on the side of the ditch. One of these strips it will be seen is bent for the purpose of giving the sod an inclination toward the side of the ditch.

The operation is as follows: The ditch is properly prepared at the commencement of the operation by hand, and the machine is brought to its proper position, and the operator applies his weight to the front end of the lever C, and thereby forces the square cutter D D D into the ground a suitable depth, at the same time causing the spade to be thrown out to the position shown in Fig. 1. This operation cuts the sides and front edge or end of the sod. The operator next applies his weight to the back end of the lever C, and thereby causes the connecting-link to draw the spade J with great force into the cutter D and underneath the sod, thus cutting the sod entirely free. After this the cutter and sod are raised together perpendicularly. As soon as this takes place the cutter and sod swing forward about six inches, ready for another cut, and the first sod discharged, it being forced upward by the second sod, and thrown on the side of the ditch by the guide-strips O P.

It has been found by experiment that this machine answers the purpose intended admirably, and that sods seven inches square and two feet deep can be cut and removed with perfect ease. It is very simple in construction and costs but very little. This machine can be used on soft meadow to great advantage, whereas machines requiring horses to draw them cannot.

By employing a short lever with a handle passing through it, and having the handle F of the cutter attached to it in the manner shown in Figs. 1 and 2, the machine can be used to very good advantage by one man without employing a carriage to draw or propel it forward, and at the same time by removing the short lever, &c., the wheels and other appendages can be applied.

What I claim as my invention, and desire to secure by Letters Patent, is—

1. The employment of the swinging cutter D D D F H in combination with the swinging spade J K L, the whole being constructed, arranged, and operated in the manner and for the purpose substantially as herein set forth.

2. The combination of the swinging cutter D D D, swinging spade J K L, and lever C, the whole being arranged and operated in the manner and for the purposes herein specified.

JONATHAN W. MORRILL.

Witnesses:
J. C. HATHEWAY,
JOHN W. DODGE.